United States Patent
Blanco et al.

(10) Patent No.: US 6,720,673 B2
(45) Date of Patent: Apr. 13, 2004

(54) VOLTAGE ISLAND FENCING

(75) Inventors: Rafael Blanco, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 09/832,520

(22) Filed: Apr. 11, 2001

(65) Prior Publication Data
US 2002/0149263 A1 Oct. 17, 2002

(51) Int. Cl.[7] .................................................. H02J 9/00
(52) U.S. Cl. ............................ 307/64; 307/18; 307/29; 713/322; 713/330; 713/400
(58) Field of Search ........................... 307/64, 18, 29, 307/150; 713/322, 330, 400

(56) References Cited

U.S. PATENT DOCUMENTS 5,218,704 A * 6/1993 Watts et al. ................. 395/750
5,568,100 A * 10/1996 Locanthi ....................... 331/74
6,061,803 A * 5/2000 Ayache ......................... 713/501
6,367,021 B1 * 4/2002 Shay ............................ 713/300

* cited by examiner

Primary Examiner—Robert L DeBeradinis
(74) Attorney, Agent, or Firm—Schmeiser, Olsen & Watts; Richard A. Henkler

(57) ABSTRACT

A circuit for fencing input signals to circuits in a voltage island when switching between a normal and a standby power supply is disclosed. A voltage detector detects the switch over in power source and generates a power switch signal. The power switch signal is synchronized to a standby clock and a normal clock. The synchronized standby clock signal is delayed by a counter to allow circuit stabilization. The normal and standby clock signals are logically combined and used to fence input signals to the circuits on the voltage islands.

41 Claims, 13 Drawing Sheets

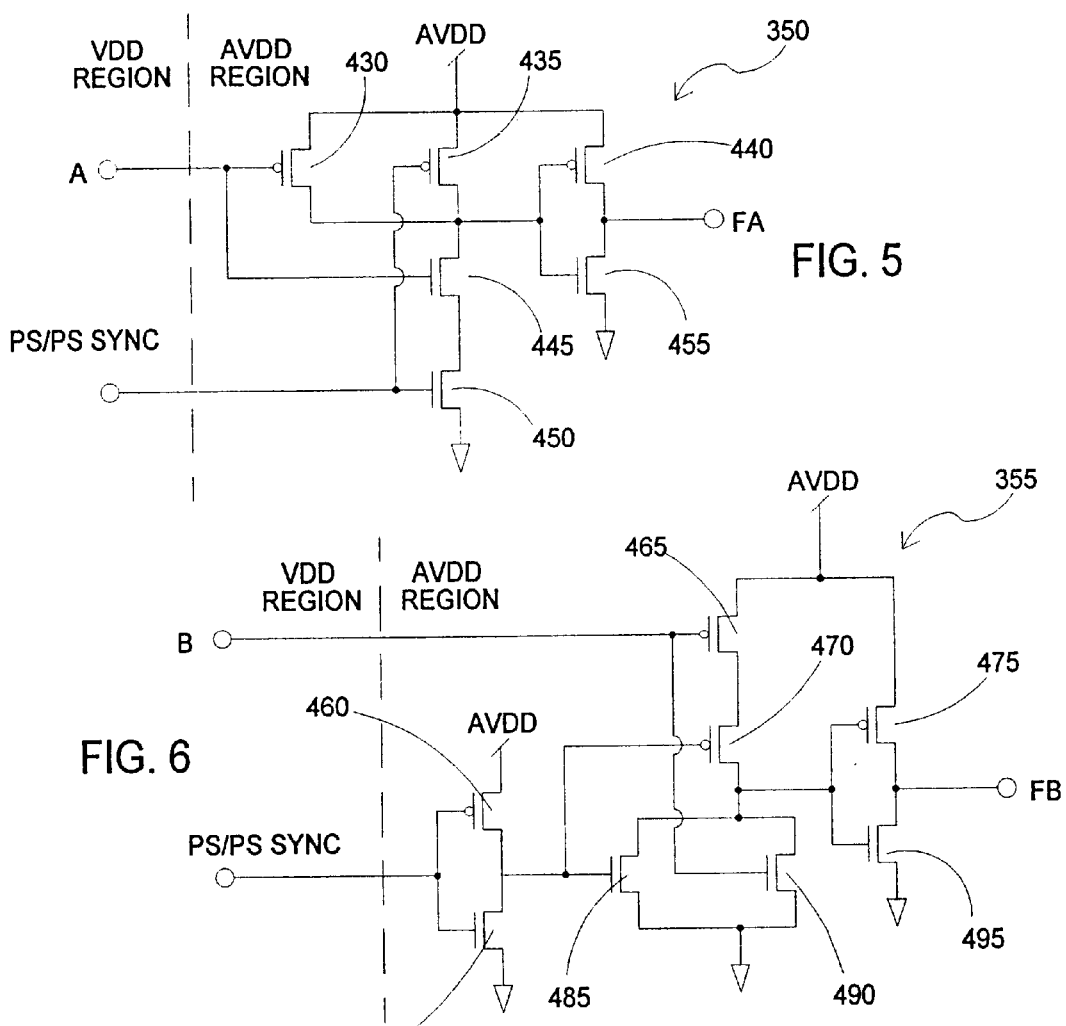
FIG. 5
FIG. 6
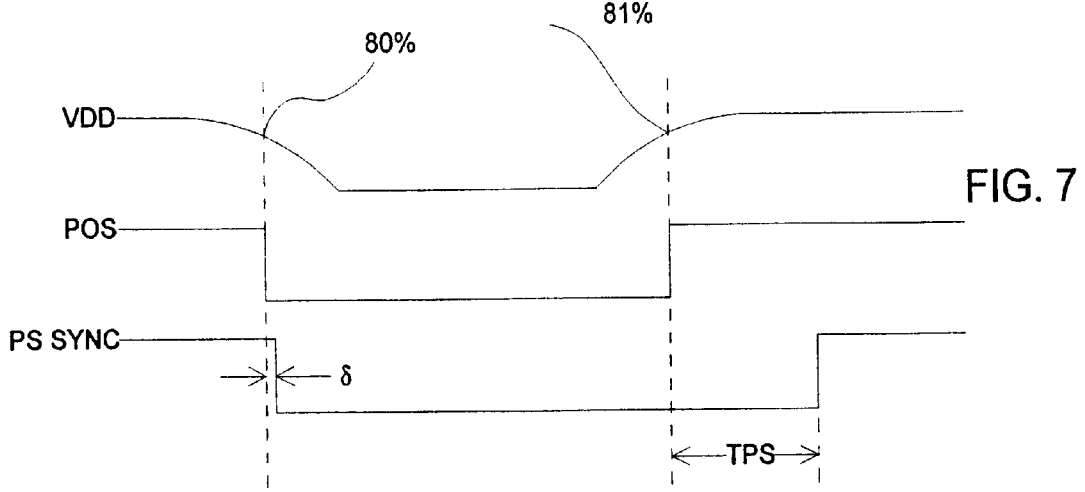
FIG. 7

VOLTAGE ISLAND FENCING

FIELD OF THE INVENTION

The present invention relates to the field of a power supply circuits; more specifically, it relates to circuit and method for switching between normal and standby power supplies in an integrated circuit.

BACKGROUND OF THE INVENTION

In order to conserve power, semiconductor devices often are designed to allow shutdown of all but a few critical circuits that are kept powered in order continue critical functions and to speed up turn on of the device when it is re-powered or not to lose data or the last state of the device before power down. These critical circuits are place on voltage islands.

Current technologies allow voltage islands to exist within dies. Different portions of the die can be powered down while other portions, typically powered isolated logic blocks or voltage islands, need to maintain power. In some cases powering off and powering on do not impact different voltage islands. However, in critical cases, for example, a real time clock, signals on the connections from logic circuits in the portions of the die that are powered down can interfere with the function of logic circuits on a voltage island that is powered up. Voltage island logic circuits are most vulnerable during the times that the die first powers down, and the voltage island switches from normal to standby power, during the time the die is powered down and the voltage island is running on standby power and during the time the die is powered up and the voltage island is switched back to normal power. As a result creating a safe isolation method and restoration mechanism for the connections to the voltage islands is important to avoid malfunctions of the die during power down, standby and power up. Fencing is the name coupled to a method of isolation and restoration of voltage islands.

Generally, it is only the inputs to a voltage island that are of concern during the transition periods between normal and standby power and the standby period. Some inputs need to be isolated, such as test clocks, control signals, data buses and scan control signals. Some inputs need to be isolated and glitchless, such as clock-ins, inputs to self timed logic circuits and other circuits sensitive to input signal edges. Glitches occur when signals turn on or turn off. Glitches can make latches switch, so the data stored on the latch is wrong or they can make the latch become meta-stable which requires a significant amount of time to resolve.

FIG. 1 is a diagram illustrating voltage islands on a semiconductor die. In FIG. 1, die 100 is comprised of a plurality of input/output (I/O) pads 105, wire I/O pads 106 and a circuit area 110. Circuit area 110 includes a first voltage island 115, a second voltage island 120, a clock circuit 125 and a plurality of electrostatic discharge isolation/receiver (ESD/R) circuits 130 and ESD circuits 131. I/O pads 105 are connected to ESD/R circuits 130. Wire I/O pads 106 are connected to ESD circuits 131. ESD circuits 131 are not connected to VDD. A portion of I/O pads 105 provides input signals 135 to circuits in circuit area 110. A portion of I/O pads 105 provide output signals 140 from circuits in circuit area 110. A portion of I/O pads 105 provide input signals 145 to circuits in voltage island 115. A portion of I/O pads 106 provide input signals 146 to voltage island 115. A portion of I/O pads 106 provide input signals 147 to clock circuit 125. A portion of I/O pads 105 provide output signals 150 from circuits in voltage island 115. Voltage island 115 has inputs 155 from and outputs 160 to circuits in circuit area 110. Voltage island 115 also has an input 165 from clock circuit 125 and an output 170 to voltage island 120. Voltage island 120 has inputs 175 from and outputs 180 to circuits in circuit area 110. Inputs 145, 155, 165 and 175 require fencing for safe switch over from normal to standby power and back again. Inputs 146 and 147 do not require fencing as there is no connection to VDD An important requirement for fencing is to allow enough time between the start of power down/up and the completion of power down/up operations to ensure the die enough time to become stable or to reset properly.

SUMMARY OF THE INVENTION

A first aspect of the present invention is a circuit for fencing input signals to circuits in a voltage island when switching between a normal power supply and a standby power supply, comprising: a voltage detector outputting a power sense signal in response to a fall to a first voltage value from a reference value or a rise to a second voltage value from the reference value of the voltage of the normal power supply; a standby clock generating a standby clock signal; a standby clock synchronizing circuit receiving the power sense signal and the standby clock signal, synchronizing the power sense signal to the standby clock domain and outputting a standby clock synchronized power sense signal; a counter receiving the standby clock synchronized power sense signal and the power sense signal, adding a delay to the standby clock synchronized power sense signal and outputting a delayed standby clock synchronized power sense signal; a normal clock synchronizing circuit receiving the delayed standby clock synchronized power sense signal, synchronizing the delayed standby clock synchronized power sense signal to the normal clock domain and outputting a delayed normal clock synchronized power sense signal; and fencing logic circuit receiving the delayed normal clock synchronized power sense signal and forcing the input signals high or low synchronously with the delayed normal clock synchronized power sense signal.

A second aspect of the present invention is a circuit for fencing input signals to circuits in a voltage island when switching between a normal power supply and a standby power supply, comprising: a voltage detector outputting a power sense signal in response to a fall to a first voltage value from a reference value or a rise to a second voltage value from the reference value of the voltage of the normal power supply; a standby clock generating a standby clock signal; a standby clock synchronizing circuit receiving the power sense signal and the standby clock signal, synchronizing the power sense signal to the standby clock domain and outputting a standby clock synchronized power sense signal; a counter receiving the standby clock synchronized power sense signal and the standby clock signal, adding a delay to the standby clock synchronized power sense signal and outputting a delayed standby clock synchronized power sense signal; and fencing logic circuit receiving the delayed standby clock synchronized power sense signal and forcing the input signals high or low synchronously with the delayed standby clock synchronized power sense signal.

A third aspect of the present invention is a method for fencing input signals to circuits in a voltage island when switching between a normal power supply and a standby power supply, comprising: outputting a power sense signal in response to a fall to a first voltage value from a reference value or a rise to a second voltage value from the reference value of the voltage of the normal power supply; generating a standby clock signal; synchronizing the power sense signal to the standby clock domain to create a standby clock synchronized power sense signal; adding a delay to the standby clock synchronized power sense signal to create a delayed standby clock synchronized power sense signal; synchronizing the delayed standby clock synchronized power sense signal to the normal clock domain to create a delayed normal clock synchronized power sense signal; and forcing the input signals high or low synchronously with the delayed normal clock synchronized power sense signal.

A fourth aspect of the present invention is a method for fencing input signals to circuits in a voltage island when switching between a normal power supply and a standby power supply, comprising: outputting a power sense signal in response to a fall to a first voltage value from a reference value or a rise to a second voltage value from the reference value of the voltage of the normal power supply; generating a standby clock signal; synchronizing the power sense signal to the standby clock domain to create a standby clock synchronized power sense signal; adding a delay to the standby clock synchronized power sense signal to create a delayed standby clock synchronized power sense signal; and forcing the input signals high or low synchronously with the delayed standby clock synchronized power sense signal.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIGS. 5 and 6 are schematic diagrams of force to logical zero circuit 350 and force to logical one circuit 355 of fencing logic circuit 245 of the circuit illustrated in FIG. 3 according to the present invention;

FIG. 7 is a timing diagram illustrating the timing between the VDD, POS and PS-Sync signals of the circuit illustrated in FIG. 2 according to the first embodiment of the present invention;

DETAILED DESCRIPTION OF THE INVENTION

The circuit and method of fencing of the present invention protects power isolated logic blocks, which may be application specific integrated circuits (ASIC) or cores or voltage island (cores) when the rest of the die is powered down/on by generating a power sense signal that detects a threshold drop in VDD. When VDD is turned off or restored the power sense signal is delayed a specified amount of time. This delay allows enough time for the die to become stable or to be reset. The circuit uses a glitchless voltage detector that contains some hysteresis between the falling and rising of VDD. The output of the voltage detector is guaranteed to remain low when power falls to a first predetermined fraction of VDD (or a reference voltage), for example 80%. A 32 KHz oscillator, powered by standby power during power down, is used for clocking the logic. All signals to the voltage island that will lose power are forced (fenced) to their logical functional values so in they are in their functional mode when they reach the minimum technology operating voltage.

Figure 1:
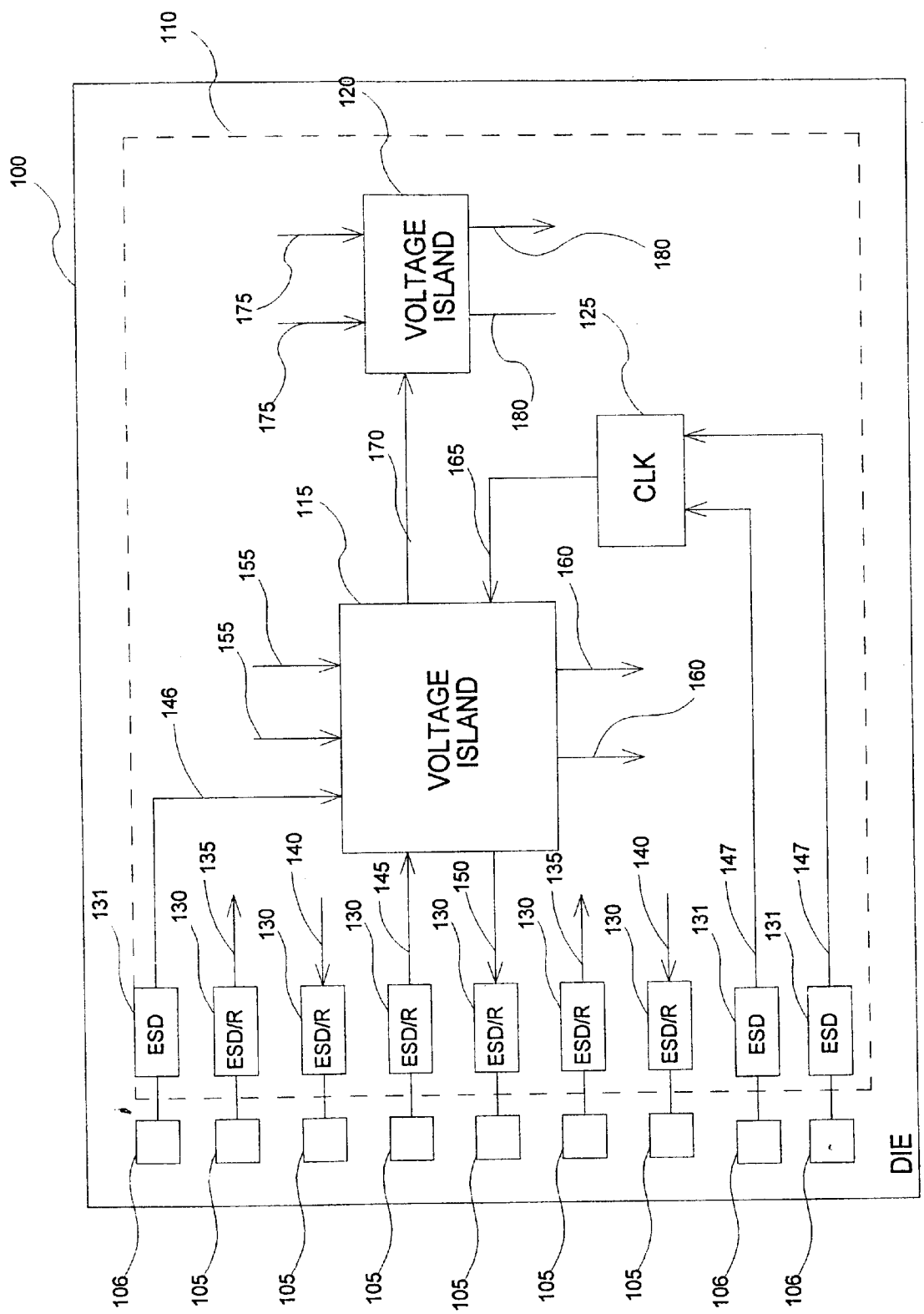
FIG. 1 is a diagram illustrating voltage islands on a semiconductor die.
Figure 2:
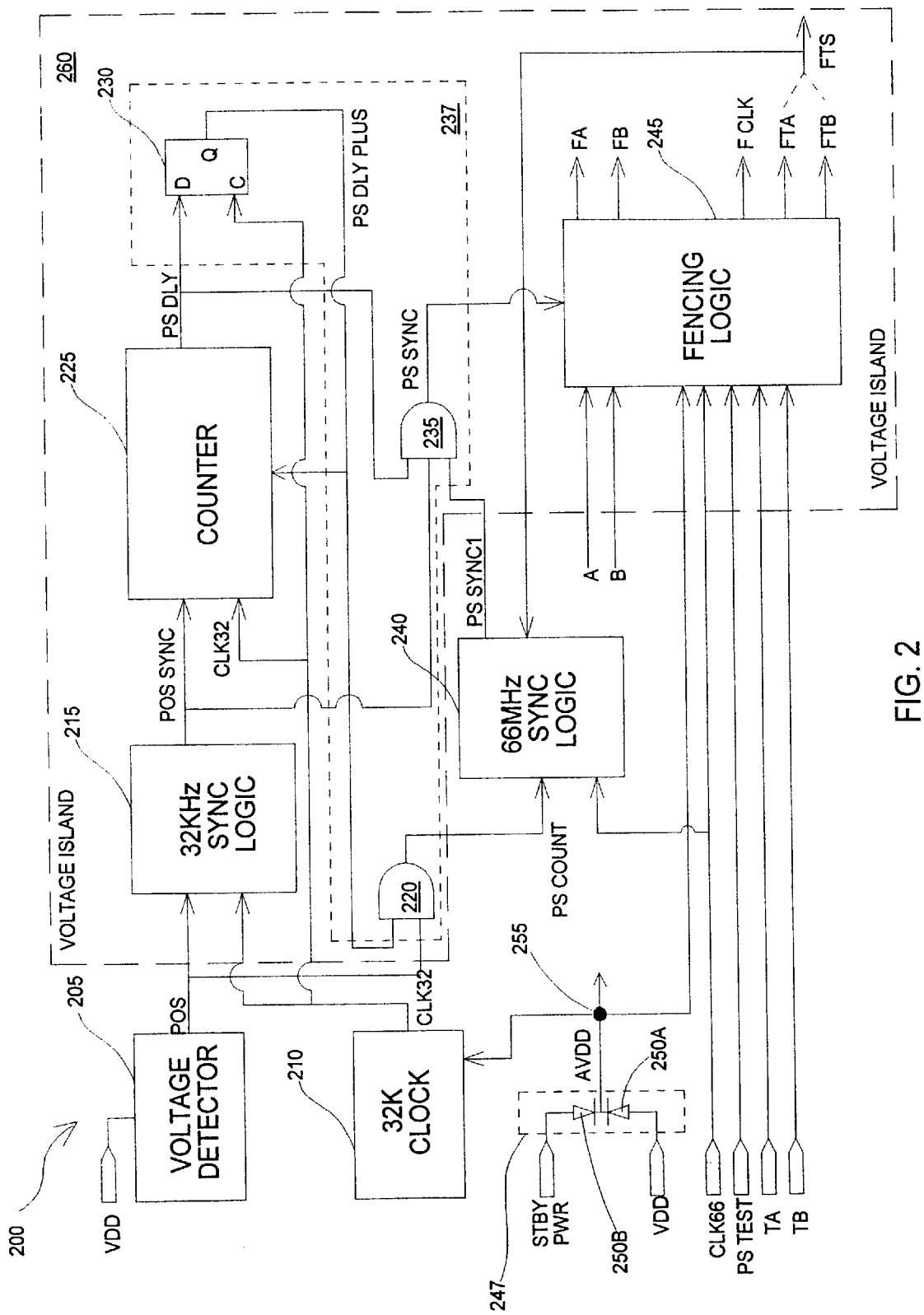
FIG. 2 is a block diagram of a circuit for fencing signals to a voltage island according to a first embodiment of the present invention.

FIG. 2 is a block diagram of a circuit for fencing signals to a voltage island according to a first embodiment of the present invention. In FIG. 2, fencing circuit 200 comprises a voltage detector 205 and a 32 KHz clock 210. The outputs of voltage detector 205, a power sense signal (POS), and 32 KHz clock 210, a standby clock signal (CLK32), are both coupled to inputs of a 32 KHz synchronizing logic circuit 215. In this example, the standby clock is a 32 KHz clock. An input of voltage detector 205 is also coupled to VDD. Voltage detector 205 detects when VDD drops to the first predetermined fraction of VDD or rises a second predetermined fraction of VDD (or the reference voltage), for example 81% and then generates the POS signal which is coupled a first input of 32 KHz synchronizing logic circuit 215 and a first input of AND gate 220. Note the second predetermined value of VDD must be different than the first predetermined fraction of VDD. It may be higher or lower. 32 KHz clock 210 is a "safe clock" that provides a lower power, 32 KHz signal (CLK32) directly to 32 KHz synchronizing logic circuit 215, a counter 225, a latch 230 and indirectly to voltage island circuits and for running state machines and other functions that need to be on all the time. CLK32 is coupled to a second input of 32 KHz synchronizing logic circuit 215, a second input of counter 225 and the clock input of latch 230.

The output of 32 KHz synchronizing logic circuit 215, a standby clock synchronized power sense signal (POS SYNC), is coupled to a second input of counter 225 and a first input of an AND gate 235. AND gates 220 and 235 and latch 230 comprise combinational logic circuit 237. 32 KHz synchronizing logic circuit 215 aligns the POS signal to the CLK32 edge to output the POS SYNC signal.

The output of counter 225, a delayed standby clock synchronized power sense signal (PS DLY), is coupled to a data input of latch 230 and a second input of AND gate 235. Counter 225 imposes a delay on the POS SYNC signal. The output of latch 230 is coupled back to counter 225 and to a second input of AND gate 220. Latch 230 adds a further delay to the PS DLY signal and outputs a further delayed standby clock synchronized power sense signal (PS DLY PLUS). The PS DLY PLUS signal is coupled back to counter 225 and to the second input of AND gate 220

In this example, the normal clock is a 66 MHz clock signal (CLK66) which is coupled to a first input of a 66 MHz synchronizing logic circuit 240 and to a fencing logic circuit 245. AND gate 220 combines the PS DLY PLUS signal with the POS signal to output a PS COUNT signal, which is coupled to a second input of 66 MHz synchronizing logic circuit 240. The output of 66 MHz synchronizing logic circuit 240, a delayed normal clock synchronized power sense signal (PS SYNC1), is coupled a third input of AND gate 235. 66 MHz synchronizing logic circuit 240 is also coupled to a fenced clock signal FTS described below. PS SYNC1 is a glitchless signal. The PS SYNC1 signal is also coupled to the third input of AND gate 235. AND gate 235 combines the PS DLY signal, the POS SYNC signal and the PS SYNC1 signal to output a PS SYNC signal to fencing logic circuit 245.

Power supply 247 comprises VDD coupled to the input of a diode 250A and a standby power source (STBY PWR) coupled to the input of a diode 250B; the outputs of diodes 250A and 250B being tied together at output node 255 (AVDD.) Output node 255 is a wire I/O pad. AVDD is VDD when the circuit is in active mode or is STBY PWR when the circuit is in standby mode. Node 255 is coupled to an input of 32 KHz clock 210 and to fencing logic circuit 245.

A PS TEST signal and a plurality of test signals represented by TA and TB are coupled to fencing logic circuit 245. A plurality of logic signals represented by A and B are coupled to fencing logic circuit 245 as well. Fencing logic circuit 245 converts the CLK66 signal into a fenced clock signal F CLK, the TA and TB into fenced test signals FTA and FTB (represented by FTS) and logic signals A and B into fenced logic signals FA and FB. Fenced signals FA, FB, F CLK, FTA and FTB are forced to either a logical one or logical zero state. FA and FTA represent signals fenced to a zero logic state and FB and FTB represent signals fenced to a logical one state.

32 KHz synchronizing logic circuit 215, counter 225, fencing logic circuit 245 and AND gates 220 and 235 and latch 230 are located in a voltage island 260. Voltage island 260 is an AVDD region of a semiconductor die and all circuits in the AVDD region are powered by AVDD power lines instead of VDD power lines.

An example application of fencing circuit 200 is for a Real Time Clock with the STBY PWR being supplied by a battery. Once the real time clock is initialized power to it must be maintained. It is impractical to keep the entire chip powered up so power is supplied to the real time clock only. The present invention allows a Real Time Clock to be placed on voltage island 260 instead of being external to the semiconductor die.

Figure 3:
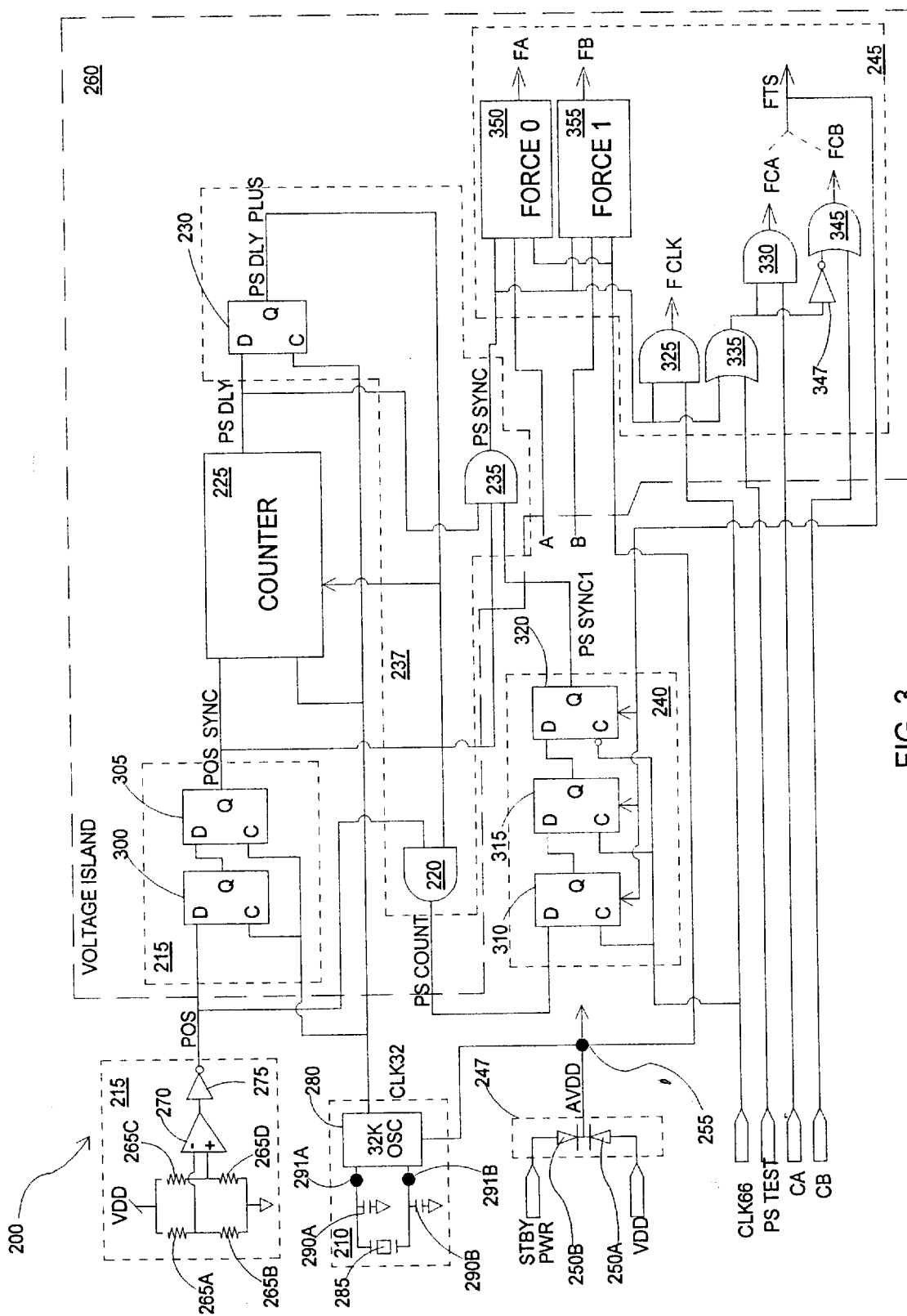
FIG. 3 is a schematic diagram of the circuit illustrated in FIG. 2 according to the first embodiment of the present invention.

FIG. 3 is a schematic diagram of the circuit illustrated in FIG. 2 according to the first embodiment of the present invention. In FIG. 3, voltage detector 205 is comprised of a resistor 265A coupled in series to a resistor 265B and a resistor 265C coupled in series to a resister 265D. Resistors 265A and 265C are coupled to VDD and resistors 265B and 265D are coupled to ground (GND). The negative input of an amplifier 270 is coupled between resistors 265A and 265C. The positive input of amplifier 270 is coupled between resistors 265B and 265D. An inverter 275 is coupled to the output of amplifier 270. The output of inverter 275 is the POS signal. Hysteresis is introduced into voltage detector 205 by selection of values for resistors 265A through 265D.

32 KHz clock 210 is comprised of a 32K oscillator coupled to a crystal 285. One side of crystal 285 is coupled to a first input of 32K oscillator 280 and the opposite side of crystal 285 is coupled to a second input of the 32K oscillator. A capacitor 290A is coupled between the first input of 32K oscillator 280 and GND and a capacitor 290B is coupled between the second input of the 32K oscillator and GND. The output of 32K oscillator 280 is the CLK32 signal. Nodes 291A and 291B are wire I/O pads. 32 KHz synchronizing logic circuit 215 is comprised of an inverter element 295, a latch 300 and a latch 305. Latches 300 and 305 are flip-flops (edge triggered). The output of 32K oscillator 280 (CLK32) is coupled to clock inputs of latches 300 and 305, counter 225 and the clock input of latch 230. The output of inverter 275 of voltage detector 205 (POS) is coupled to a data input of latch 300. The output of latch 300 is coupled to the data input of latch 305. The output of latch 305 is the first output (POS SYNC) of 32 KHz synchronizing logic circuit 215.

66 MHz synchronizing logic circuit 240 is comprised of latches 310, 315 and 320. Latches 310 and 315 are flip-flops (edge triggered) while latch 320 is a transparent (level sensitive) latch. The data input of latch 310 is coupled to the output of AND gate 220 (PS COUNT). The output of latch 310 is coupled to the input of latch 315 and the output of latch 315 is coupled to the input of latch 320. The output of latch 320 (PS SYNC1) is coupled to the input of AND gate 235. The clock input of each of latches 310, 315 and 320 are coupled to the CLK66 signal. Latches 310, 315 and 320 are also coupled to the FTS signal. Latches 310 and 315 synchronize the PS COUNT signal to the 66 MHz clock domain. Latch 320 synchronizes the PS COUNT signal to the low phase of the 66 MHz clock domain.

Fencing logic circuit 245 is comprised of an AND gate 325, an AND gate 330, an OR gate 335, an OR gate 345, an inverter 347, a force to logical zero circuit 350 and a force to logical one circuit 355. The CLK66 signal is coupled to a first input of AND gate 325. The PS TEST signal is coupled to a first input of OR gate 335. PS TEST is a wire I/O pad signal. The CA signal is coupled to a first input of AND gate 330. The CB signal is coupled to a first input of OR gate 325. A second input of AND gate 325 is coupled to a second input of OR gate 335 and to PS SYNC. The output of AND gate 325 is the F CLK signal. The output of OR gate 335 is coupled to a second input of AND gate 330 and the input of inverter 347. The output of inverter 347 is coupled to a second input of OR gate 345. The output of AND gate 330 is the FCA signal. The output of OR gate 345 is the FCB signal. The output of AND gate 235 is coupled to first inputs of force to logical zero circuit 350 and force to logical one circuit 355. The A signal is coupled to a third input of force to logical zero circuit 350 and the B signal is coupled to a third input of force to logical one circuit 355.

Figure 4:
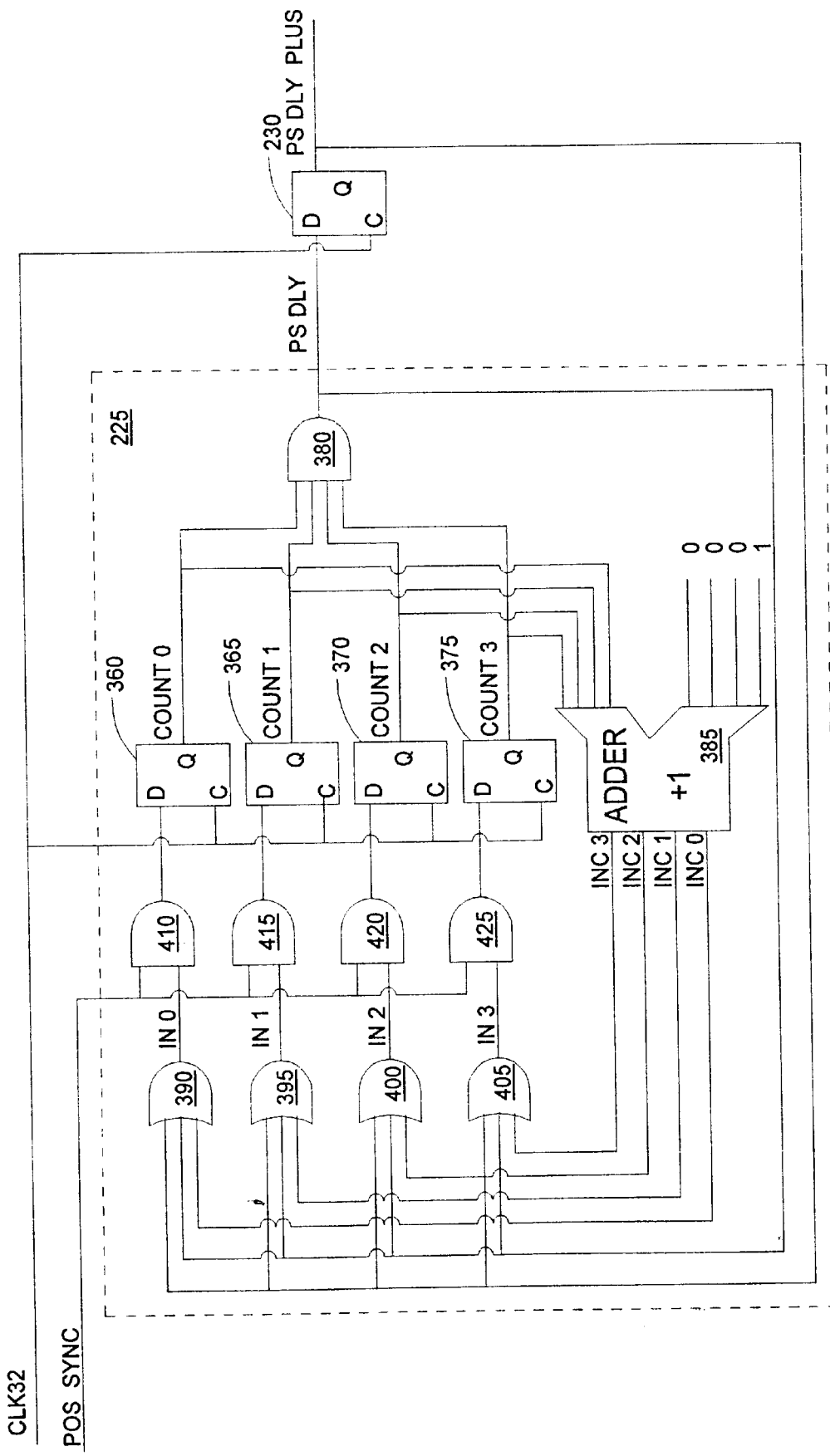
FIG. 4 is a schematic diagram of counter 225 of the circuit illustrated in FIG. 3 according to the first embodiment of the present invention.

FIG. 4 is a schematic diagram of counter 225 of the circuit illustrated in FIG. 3 according to the first embodiment of the present invention. In FIG. 4, the CLK32 signal is coupled to the clock input of latches 360, 365, 370, and 375. The output of latch 360 is a COUNT 0 signal. The output of latch 360 is coupled to a first input of an AND gate 380 and to a first input of an ADDER 385. The output of latch 365 is a COUNT 1 signal. The output of latch 365 is coupled to a second input of AND gate 380 and to a second input of ADDER 385. The output of latch 370 is a COUNT 2 signal. The output of latch 370 is coupled to a third input of AND gate 380 and to a third input of ADDER 385. The output of latch 375 is a COUNT 3 signal. The output of latch 375 is coupled to a fourth input of AND gate 380 and to a fourth input of ADDER 385. The output of AND gate 380 is the PS DLY signal. The output of AND gate 380 is also coupled to a first input of each of OR gates 390, 395, 400 and 405. The PS DLY PLUS signal from latch 230 is coupled to a second input of each of OR gates 390, 395, 400 and 405. ADDER 385 has four outputs. A first output (INC 0) of ADDER 385 is coupled to a third input of OR gate 390. A second output (INC 0) of ADDER 385 is coupled to a third input of OR gate 395. A third output (INC 2) of ADDER 385 is coupled to a third input of OR gate 400. A fourth output (INC 3) of ADDER 385 is coupled to a fourth input of OR gate 405. The POS SYNC signal is couple to a first input of each of AND gates 410, 415, 420 and 425. The output of OR gate 390 is coupled to a second input of AND gate 410. The output of OR gate 395 is coupled to a second input of AND gate 415. The output of OR gate 400 is coupled to a second input of AND gate 420. The output of OR gate 405 is coupled to a second input of AND gate 425. The output of AND gate 410 is coupled to a data in of latch 360. The output of AND gate 415 is coupled to a data in of latch 365. The output of AND gate 420 is coupled to a data in of latch 370. The output of AND gate 425 is coupled to a data in of latch 375.

In operation, counter 225 increments while the POS SYNC signal is high until a maximum count is reached. Counter 225 functions only during power-up, that is, when VDD is turned back on. When the maximum count is reached, the counter will stop incrementing. The counter is initialized to zero when the POS SYNC is low and will remain in the zero state until POS SYNC transitions to high. Counter 225 is, in the present example, a four bit counter with a maximum count of 16. With a 32 KHz clock a 500 microsecond delay is realized. Latches 360, 365, 370 and 375 store the current count. To increase the delay additional latches are added. For example, 5 latches yields a maximum count of $5^2$ (32) and a delay of one millisecond.

FIGS. 5 and 6 are schematic diagrams of force to logical zero circuit 350 and force to logical one circuit 355 of fencing logic circuit 245 of the circuit illustrated in FIG. 3 according to the present invention. In FIG. 5, force to logical zero circuit 350 is comprised of PFETs 430, 435 and 440 and NFETs 445, 450 and 455. The A signal (the signal to be fenced to zero) is coupled to the gates of PFET 430 and NFET 445. The PS SYNC signal (or PS signal in the second embodiment of the present invention) is coupled to the gates of NFET 450 and PFET 435. The sources of PFETS 430, 435 and 440 are coupled to AVDD. The drains of NFETs 450 and 455 are coupled to GND. The source of NFET 445 is coupled to the drain of NFET 450. The drains of PFET 435 and NFET 445 are coupled together and to the gates of PFET 440 and NFET 455. The drains of PFET 440 and NFET 455 are coupled together and output the FA signal (the fenced A signal).

In FIG. 6, force to logical one circuit 355 is comprised of PFETs 460, 465, 470 and 475 and NFETs 480, 485, 490 and 495. The PS SYNC signal (or PS signal in the second embodiment of the present invention) is coupled to the gates of PFET 460 and NFET 480. The B signal (the signal to be fenced to one) is coupled to the gates of PFET 465 and NFET 490. The sources of PFETs 465 and 475 are coupled to AVDD. The sources of NFETs 480, 485, 490 and 495 are coupled to GND. The drains of PFET 460 and NFET 480 are coupled to the gates of NFET 485 and PFET 470. The source of PFET 470 and the drain of PFET 465 are coupled together. The drains of NFETs 485 and 490 and the drain of PFET 470 are coupled together and to the gates of PFET 475 and NFET 495. The drains of PFET 475 and NFET 495 are coupled together and to output the FB signal (the fenced B signal).

Since PS SYNC (or PS in the second embodiment of the present invention) is always at a logical one or logical zero state the PS SYNC signal can be used to fence inputs A and B to voltage island 260. As VDD drops the A signal drops to an unknown state "X". In FIG. 5, PFET 430 and NFET 445 could both be on or both off, however, when PS SYNC (or PS) is low, NFET 450 will be off and PFET 435 will be on, forcing the AF signal to a high state. In FIG. 6, when the B signal is in the "X" state, PFET 465 and NFET 490 could both be on or both off, however when PS SYNC (or PS) is low, NFET 485 will be on and PFET 470 will be off, forcing the BF signal to a high state.

It is appropriate to now discuss some signal timing in fencing circuit 200. FIG. 7 is a timing diagram illustrating the timing between the VDD, POS and PS SYNC signals of the circuit illustrated in FIG. 2 according to the present invention. In FIG. 7, the POS signal transitions from high to low at the point VDD drops to the first predetermined fraction (80%) of its reference value and transitions from low to high at the point VDD rises to the second predetermined fraction (81%) of its reference value. The PS SYNC (or PS) signal transitions from high to low a time δ after POS transitions from high to low. Delay δ is caused by the delay through AND gates 220 and 235 and latches 310, 315 and 320. PS SYNC (or PS) transitions from low to high a time TPS after POS transitions from low to high. Delay TPS is caused by counter 225, latch 230 and 66 MHz synchronizing logic circuit 240.

Figure 8:
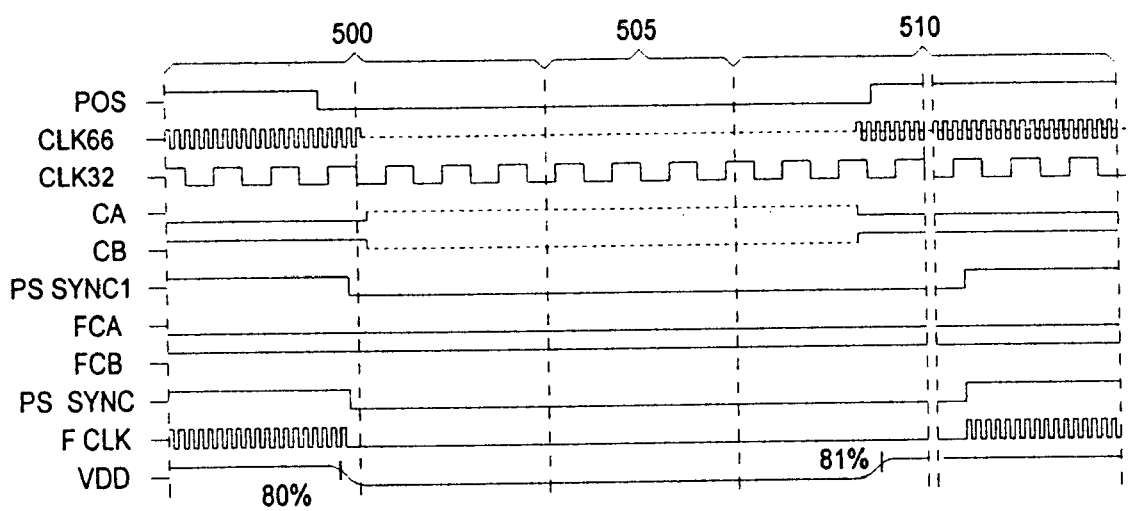
FIG. 8 is a timing diagram of the circuit of the circuit illustrated in FIG. 3 according to the first embodiment of the present invention.
Figure 9:
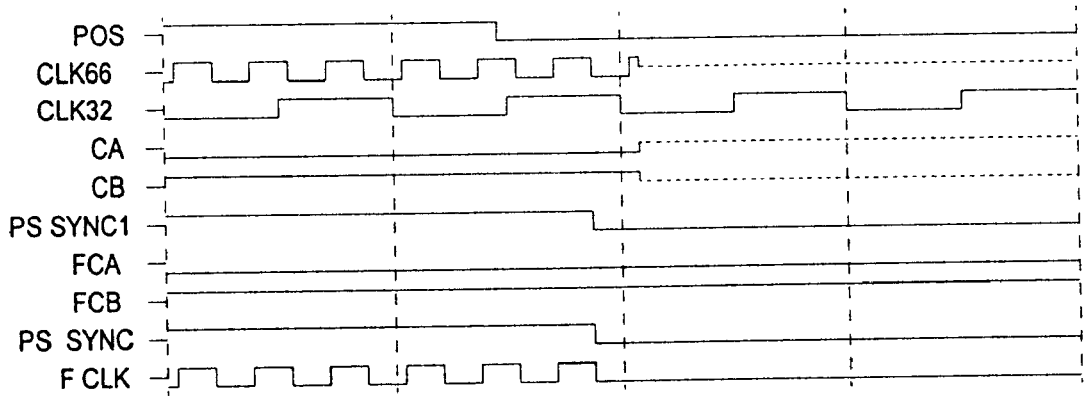
FIG. 9 is an expanded view of section 500 of the timing diagram illustrated in FIG. 9 according to the first embodiment of the present invention.
Figure 10:
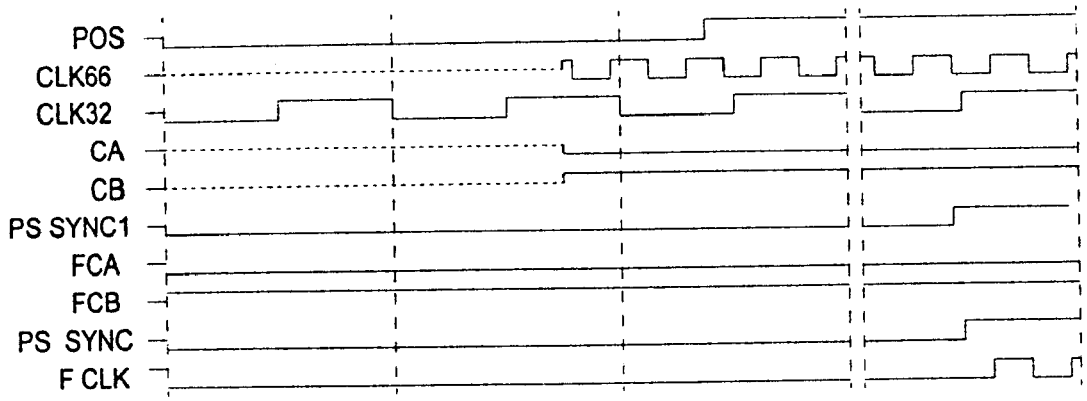
FIG. 10 is an expanded view of section 510 of the timing diagram illustrated in FIG. 9 according to the first embodiment of the present invention.
Figure 11:
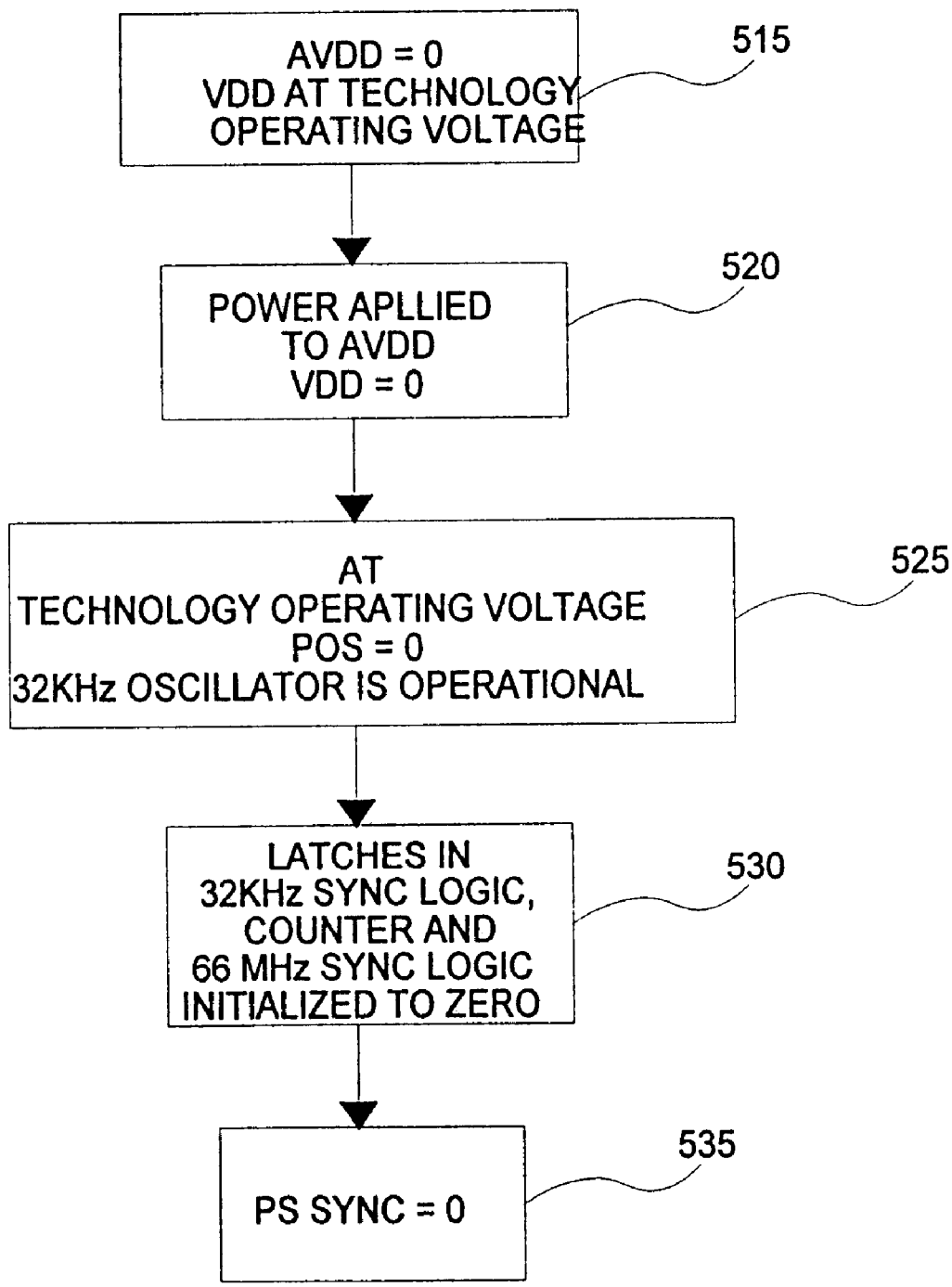
FIG. 11 is a flowchart illustrating the initial power up of AVDD according to the first embodiment of the present invention.

FIG. 8 is a timing diagram of the circuit of the circuit illustrated in FIG. 3 according to the first embodiment of the present invention. The timing diagram of FIG. 8 comprises three sections. Section 500 shows the POS, CLK66, CLK32, CA, CB, PS SYNC1, FCA, FCB, PS SYNC, F CLK and VDD signals when VDD is on and as VDD is turned off. Section 505 shows the POS, CLK66, CLK32, CA, CB, PS SYNC1, FCA, FCB, PS SYNC, F CLK and VDD signals when VDD is turned off. Section 510 shows the POS, CLK66, CLK32, CA, CB, PS SYNC1, FCA, FCB, PS SYNC, F CLK and VDD signals when VDD is on and as VDD is turned off. In FIG. 8, the dotted lines indicates indeterminate levels. In FIGS. 9, 10 and 11, the horizontal scale of CLK66 is not the same as the scale of the other parameters.

FIG. 9 is an expanded view of section 500 of the timing diagram illustrated in FIG. 8 according to the first embodiment of the present invention. In FIG. 9 the dotted lines indicates indeterminate levels. In FIG. 9, 32CLK is always on. FCA is always low and FCB is always high. POS goes from high to low before the CLK66 is turned off as does PS SYNC1 and PS SYNC, though PS SYNC and PS SYNC1 go low at the same time but after POS. PS SYNC and PS SYNC1 edges are aligned with FCLK edges. FCLK turns off when PS SYNC turns off.

FIG. 10 is an expanded view of section 510 of the timing diagram illustrated in FIG. 8 according to the first embodiment of the present invention. In FIG. 10 the dotted lines indicates indeterminate levels. In FIG. 9, 32CLK is always on. FCA is always low and FCB is always high. POS goes from low to high after the CLK66 is turned on as does PS SYNC1 and PS SYNC, though PS SYNC and PS SYNC1 are delayed "C" clock cycles, where "C" is equal to the maximum count in counter 225, in the present example, 16 32CLK cycles. PS SYNC and PS SYNC1 edges are aligned with CLK66 and FCLK edges. FCLK turns off when PS SYNC turns off.

FIG. 11 is a flowchart illustrating the initial power up of AVDD according to the first embodiment of the present invention. By initial power up we mean the first time an alternative source of power (i.e. a battery, is hooked up to the circuit.) Initially, in step 515, AVDD is off and VDD is at the device technology operating voltage. Next in step 520, power is applied to AVDD and AVDD is allowed to reach the device technology before VDD is shutdown. In step 525, with AVDD at the device technology operating voltage, POS is off and the 32 KHz oscillator is operational. In step 530, latches 300 and 305 in 32 KHz synchronizing logic circuit 215 and latches 310, 315 and 320 in 66 MHz synchronizing logic circuit 240 are initialized to zero. Finally, in step 535, PS SYNC goes to zero.

Figure 12:
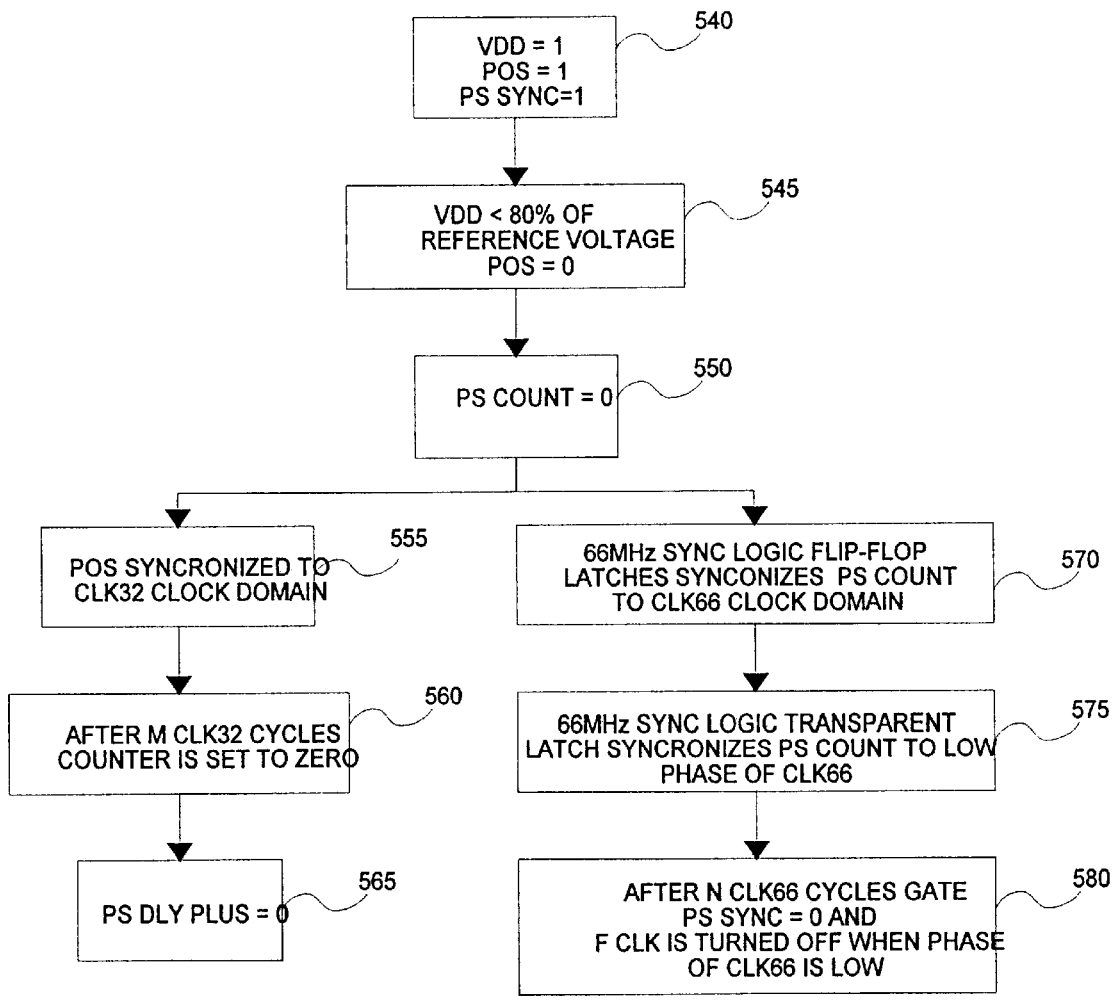
FIG. 12 is a flowchart illustrating power down of VDD according to the first embodiment of the present invention.

FIG. 12 is a flowchart illustrating power down of VDD according to the first embodiment of the present invention. In step 540, before VDD is turned off, VDD is high, POS is high and PS SYNC1 is high. In step 545, VDD falls to 80% of its reference voltage level and POS goes low. In step 550, AND gate 220 turns off and PS COUNT goes to zero. In step 555, POS is synchronized to the CLK32K clock domain by 32K synchronizing logic circuit 215. Next, in step 560, after "M" CLK32 cycles latches 360, 365, 370, and 370 in counter 225 are set to zero count driving PS DLY to zero. Then, in step 565, PS DLY PLUS goes to zero. In the present example, "M" is between about 1 and 2 CLK32 cycles. Step 570 is simultaneous with step 555. In step 570, 66 MHz synchronizing logic circuit 240 latches 310 and 315 synchronize PS COUNT to the CLK66 clock domain. Next, in step 575, 66 MHz synchronizing logic circuit 240 latch 320 synchronize PS COUNT to the low phase of the CLK66 domain. Then, in step 580, after "N" CLK66 cycles, AND gate 235 turns off, PS SYNC goes low and AND gate 325 of fencing logic circuit 245 is turned off when the phase of CLK66 is low. In the present example, "N" is between about 1.5 and 2.5 CLK66 cycles.

Figure 13:
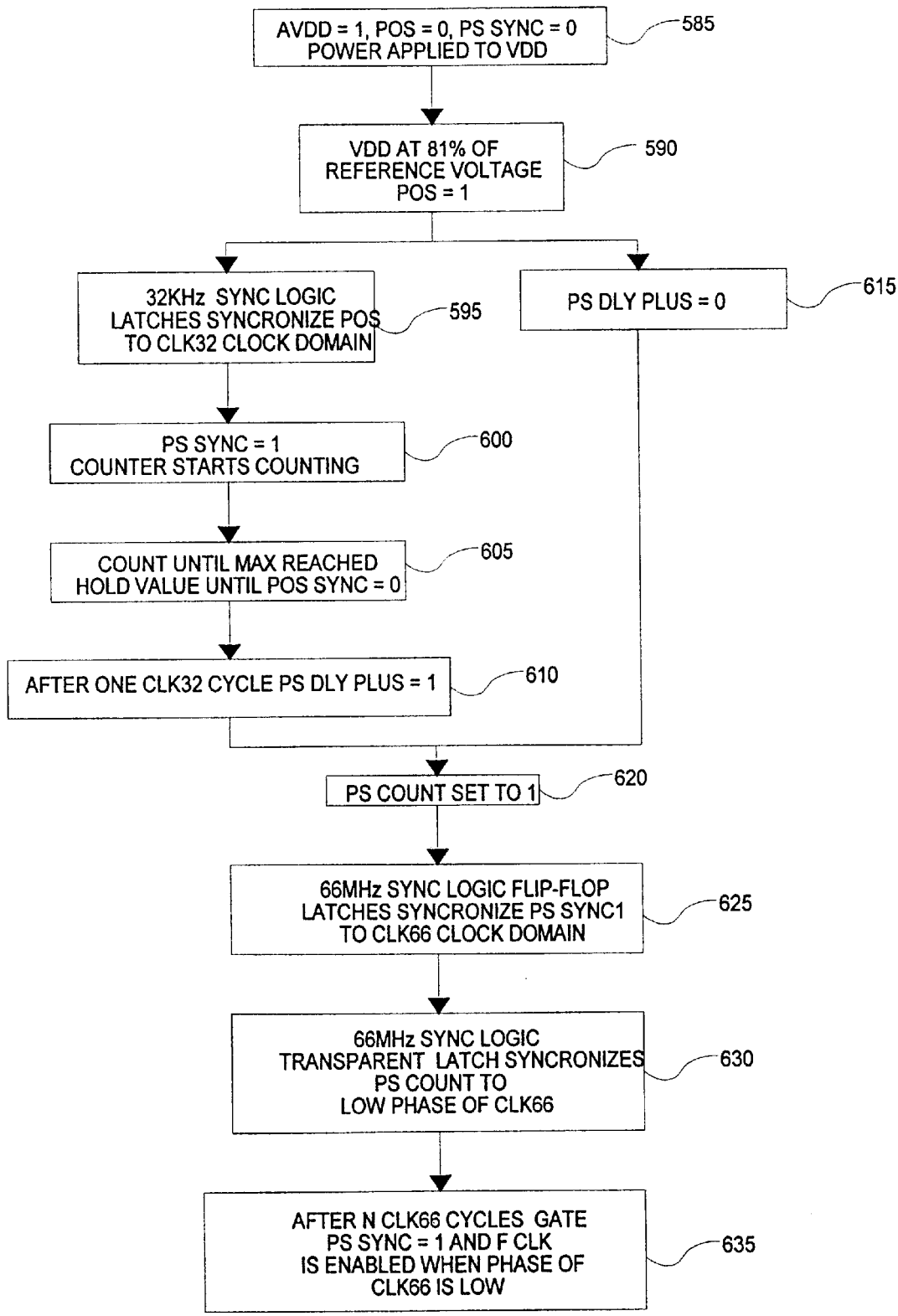
FIG. 13 is a flowchart illustrating the power up of VDD according to the first embodiment of the present invention.

FIG. 13 is a flowchart illustrating the power up of VDD according to the first embodiment of the present invention. In step 585, AVDD is on, POS is low, PS SYNC is low before power is applied to VDD. In step 590, when VDD rises to 81% of its reference value POS goes high. In step, 595 latches 310, 315 and 320 of 32 KHz synchronizing logic circuit 215 synchronize POS to the CLK32 clock domain. In step 600, PS SYNC goes to 1 and counter 225 starts incrementing. In step 605, counter 225 increments until a maximum count is reached (in this example 16) and the count stays at maximum until POS SYNC goes low. In step 610, after one CLK32 cycle, PS DLY PLUS goes high. Step 615 occurs simultaneously with step 595 and before step 610. In step 615, the output of AND gate 220 (PS COUNT) is held low by the output of latch 230 (PS DLY PLUS) being low. Then, in step 620, PS COUNT goes high. In step 625, latches 310 and 315 of 66 MHz synchronizing logic circuit 240 synchronize PS COUNT to the CLK66 clock domain. In step 630, latch 320 of 66 MHz synchronizing logic circuit 240 synchronizes PS COUNT to the low phase of the CLK66 domain. Finally, in step 635, after "N" CLK66 cycles, AND gate 235 turns on, PS SYNC goes high and AND gate 325 of fencing logic circuit 245 is turned on when the phase of CLK66 is low. In the present example, "N" is between about 1.5 and 2.5 CLK66 cycles.

Figure 14:
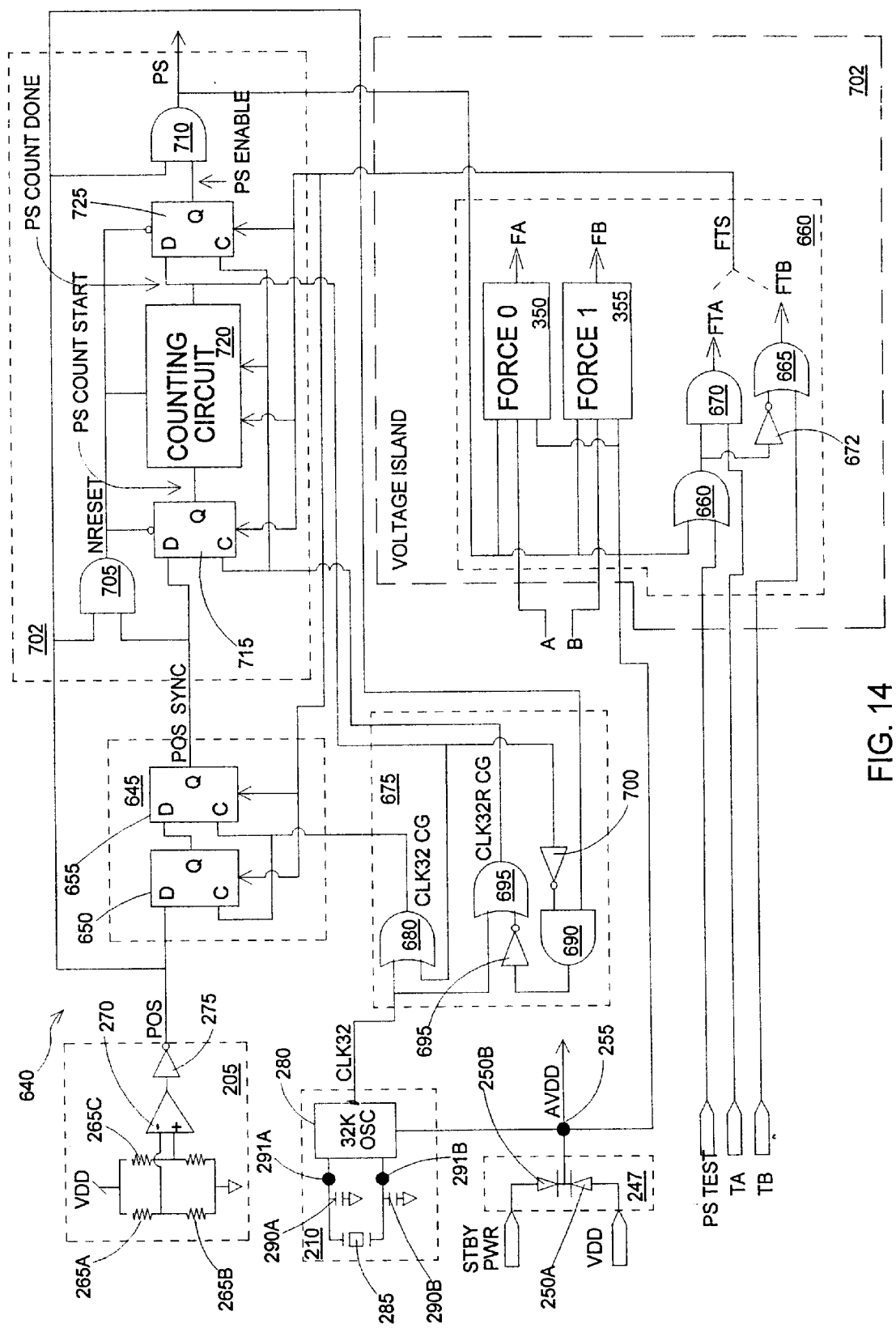
FIG. 14 is a schematic diagram of a fencing circuit 640 for fencing signals to a voltage island according to a second embodiment of the present invention.

FIG. 14 is a schematic diagram of fencing circuit 640 for fencing signals to a voltage island according to a second embodiment of the present invention. In FIG. 14, a 32 KHz synchronizing logic circuit 645 comprises a latches 650 and 655, a fencing logic circuit 660 comprises force to logical zero circuit 350, force to logical one circuit 355, OR gates 660 and 665, an AND gate 670 and an inverter 672, a clock logic circuit 675 comprises OR gates 680 and 695, an AND gate 690 and inverters 695 and 700, and a counter 702 comprises AND gates 705 and 710, latches 715 and 725 and a counting circuit 720. Fencing logic 660 is located on a voltage island 702.

In 32 KHz synchronizing logic circuit 645 the output of latch 650 is coupled to a data input of latch 655. The output of voltage detector 205 (POS) is coupled to a data input of latch 650 and first inputs of AND gates 705 and 710. The output of latch 655 (POS SYNC) is coupled to a second input of AND gate 705 and a data input of a latch 715. The output of latch 715 (PS COUNT START) is coupled to a first input of counting circuit 720. The output of counting circuit 720 (PS COUNT DONE) is coupled to a data input of latch 725 and a first input of OR gate 680 and the input of inverter 700. The output of AND gate 705 (NRESET) is coupled to an inverting input of latch 715, a second input of counter 720, an inverting input of latch 725 and a first input of AND gate 690. The output of latch 725 is coupled to a second input of AND gate 710. Node 255 (AVDD) is coupled to 32K oscillator 280 and first inputs of force to logical zero circuit 350 and force to logical one circuit 355. The output of 32 KHz clock 210 (CLK32) is coupled to a second input of OR gate 680 and a first input of OR gate 685. The output of inverter 700 is coupled to a second input of AND gate 690. The output of AND gate 690 is coupled to the input of inverter 695. The output of inverter 695 is coupled to a second input of OR gate 685. The output of AND gate 680 (CLK32 CG) is coupled to the clock inputs of latches 650 and 655. The output of OR gate 685 (CLK32R CG) is coupled to the clock inputs of latches 715 and 725 and a third input of counter 720. The output of AND gate 710, a delayed standby clock synchronized power sense signal (PS), is coupled to second inputs of force to logical zero circuit 350 and force to logical one circuit 355 and a first input of OR gate 660. An A signal is coupled to a third input of force to logical zero circuit 350 and a B signal is coupled to a third input of force to logical one circuit 355. The output of force to logical zero circuit 350 is signal FA and the output of force to logical one circuit 355 is signal FB. PS TEST is coupled to a second input of OR gate 660. A TA signal is coupled to a first input of AND gate 670. A TB signal is coupled to a first input of OR gate 665. The output of OR gate 670 is coupled to a second input of AND gate 670 and the input of inverter 672. The output of inverter 672 is coupled to a second input of AND gate 665. The output of AND gate 670 is signal FTA and the output of OR gate 665 is signal FTB. Signals FTA and FTB as signal FTS are coupled to latches 650, 655, 715, 725 and counter 720.

When voltage detector 205 senses VDD dropping below 80% of its reference value POS goes low ultimately causing the output of AND gate 710 (PS) to go low while all fenced devices are still in there operating states. PS remains low as VDD continues to drop to zero and holds low when VDD is zero.

Figure 15:
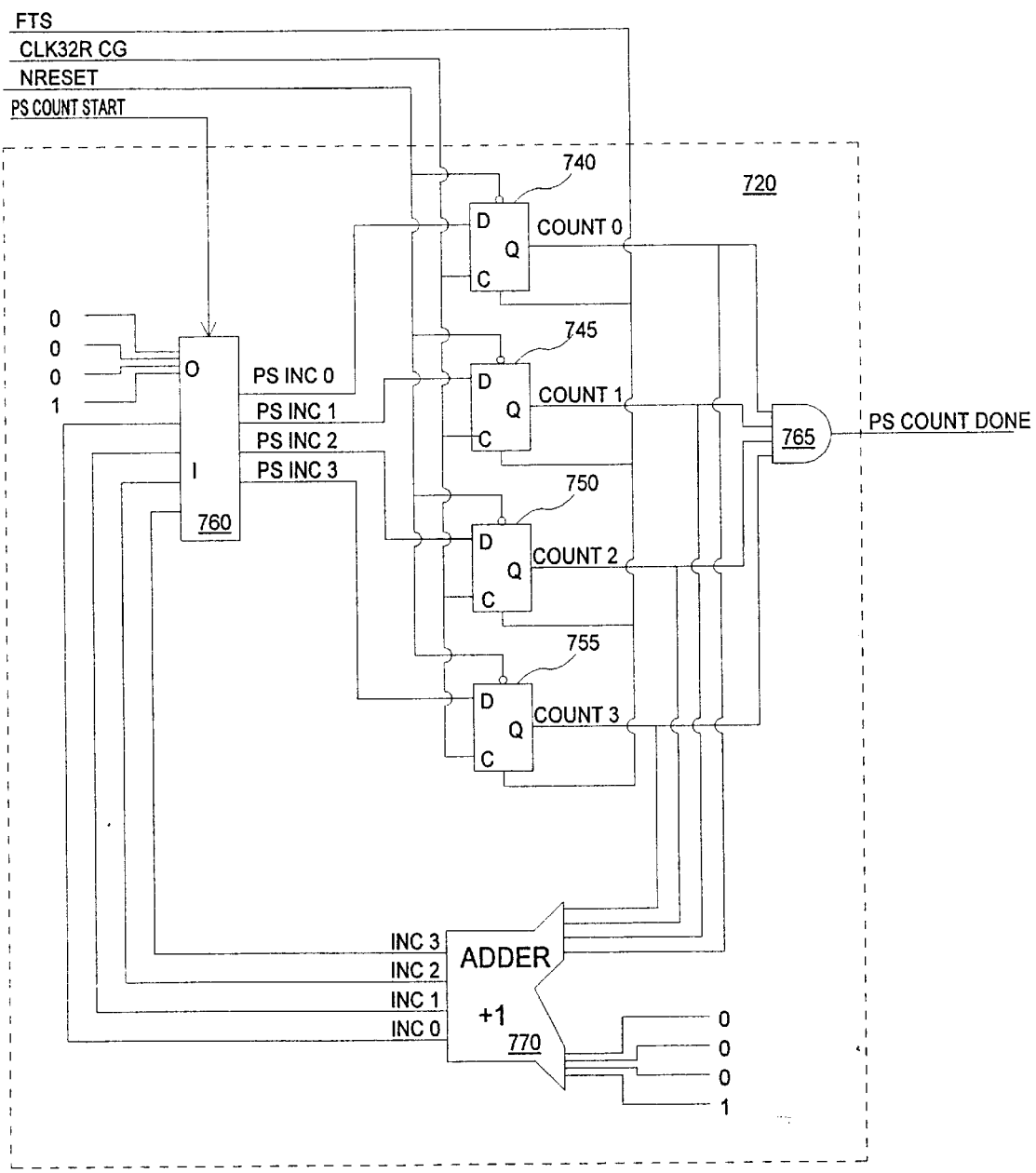
FIG. 15 a schematic diagram of the counter 720 of the circuit illustrated in FIG. 14 according to the second embodiment of the present invention.

FIG. 15 a schematic diagram of the counter 720 of the circuit illustrated in FIG. 14 according to the second embodiment of the present invention. Counter 720 comprises latches 740, 745, 750, 755, multiplexer 760, AND gate 765 and adder 770. PS COUNT is coupled to multiplexer 760, NRESET is coupled to the inverting input of latches 740, 745, 750 and 755 and CLK32R CG is coupled to first clock inputs of latches 740, 745, 750 and 755. FTS is coupled to second clock inputs of latches 740, 745, 750 and 755. The output of AND gate 765 is PS COUNT DONE. The output of latch 740 (COUNT 0) is coupled to a first input of AND gate 765 and a first input of adder 770. The output of latch 745 (COUNT 1) is coupled to a second input of AND gate 765 and a second input of adder 770. The output of latch 750 (COUNT 2) is coupled to a third input of AND gate 765 and a third input of adder 770. The output of latch 755 (COUNT 3) is coupled to a fourth input of AND gate 765 and a fourth input of adder 770. Outputs INC 0, INC 1, INC 2, and INC 3 are coupled to multiplexer 760. A first output of multiplexer 760 (PS INC 0) is coupled to the data in of latch 740. A second output of multiplexer 760 (PS INC 1) is coupled to the data in of latch 745. A third output of multiplexer 760 (PS INC 2) is coupled to the data in of latch 750. A fourth output of multiplexer 760 (PS INC 3) is coupled to the data in of latch 755.

Figure 16:
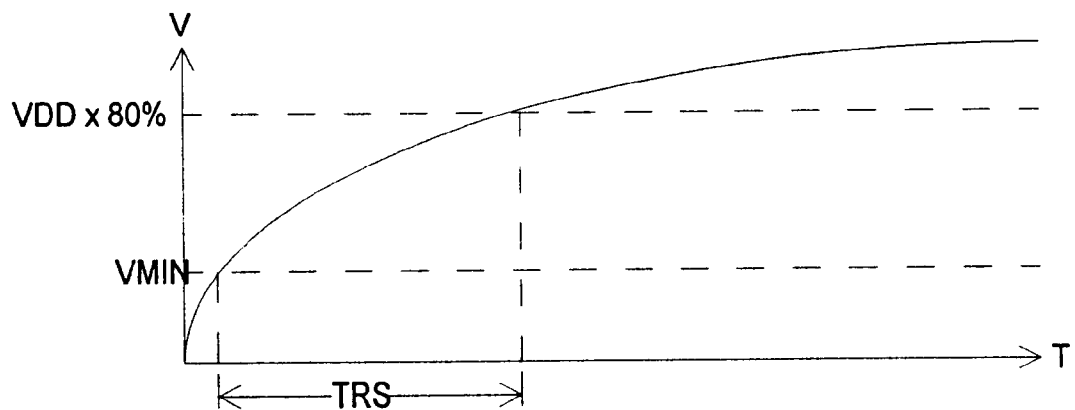
FIG. 16 is a plot of the VDD signal vs. time according to the second embodiment of the present invention.

FIG. 16 is a plot of the VDD signal vs. time according to the second embodiment of the present invention. TSR is defined by the difference in the time VDD reaches the minimum voltage required by the device technology VMIN and the time VDD reaches the first predetermined fraction (80%) of its reference value. In the present example of 66 MHz and 32 KHz clocks, TRS must be greater than or equal to 60 microseconds in order to be sure the latches 715, 725, 740, 745, 750 and 755 reset and are not in a metastable state when POS switches at the same time CLK32 switches.

Figure 17:
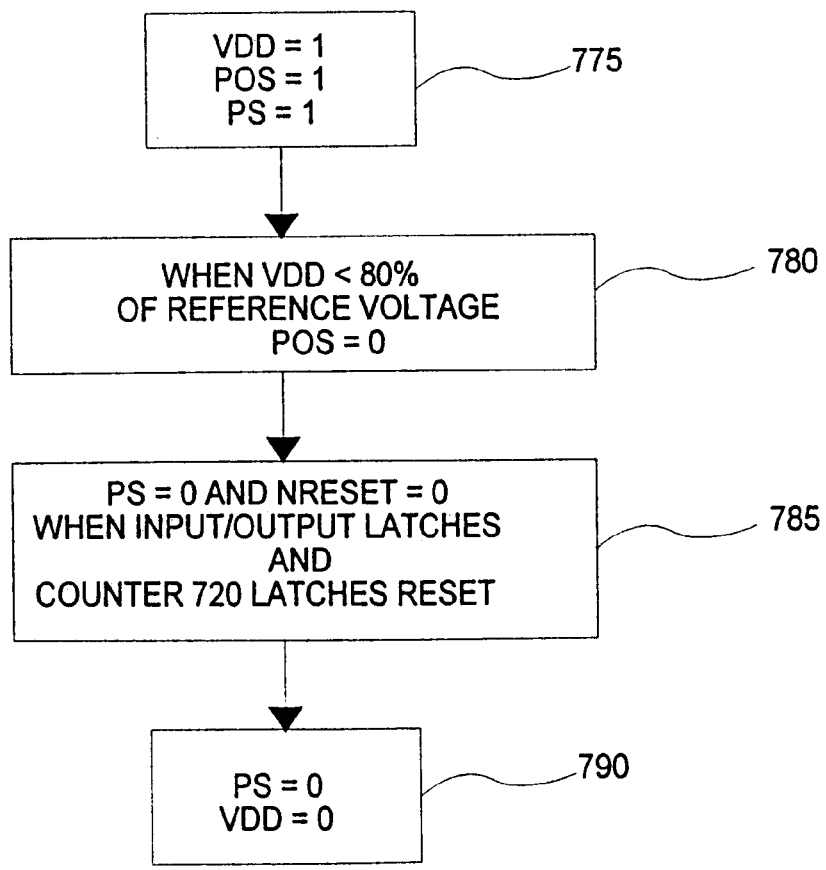
FIG. 17 is a flowchart illustrating power down of VDD according to the second embodiment of the present invention.

FIG. 17 is a flowchart illustrating power down of VDD according to the second embodiment of the present invention. In step 775 VDD, POS and PS are high. In step 780, when VDD drops to less than the first predetermined fraction (80%) of reference voltage POS goes low. In step 785, PS, NRESET go low and latches 715 and 725 as well as latches 740, 745, 750 and 755 in counter 720 reset. In step 790, PS and VDD then go low.

Figure 18:
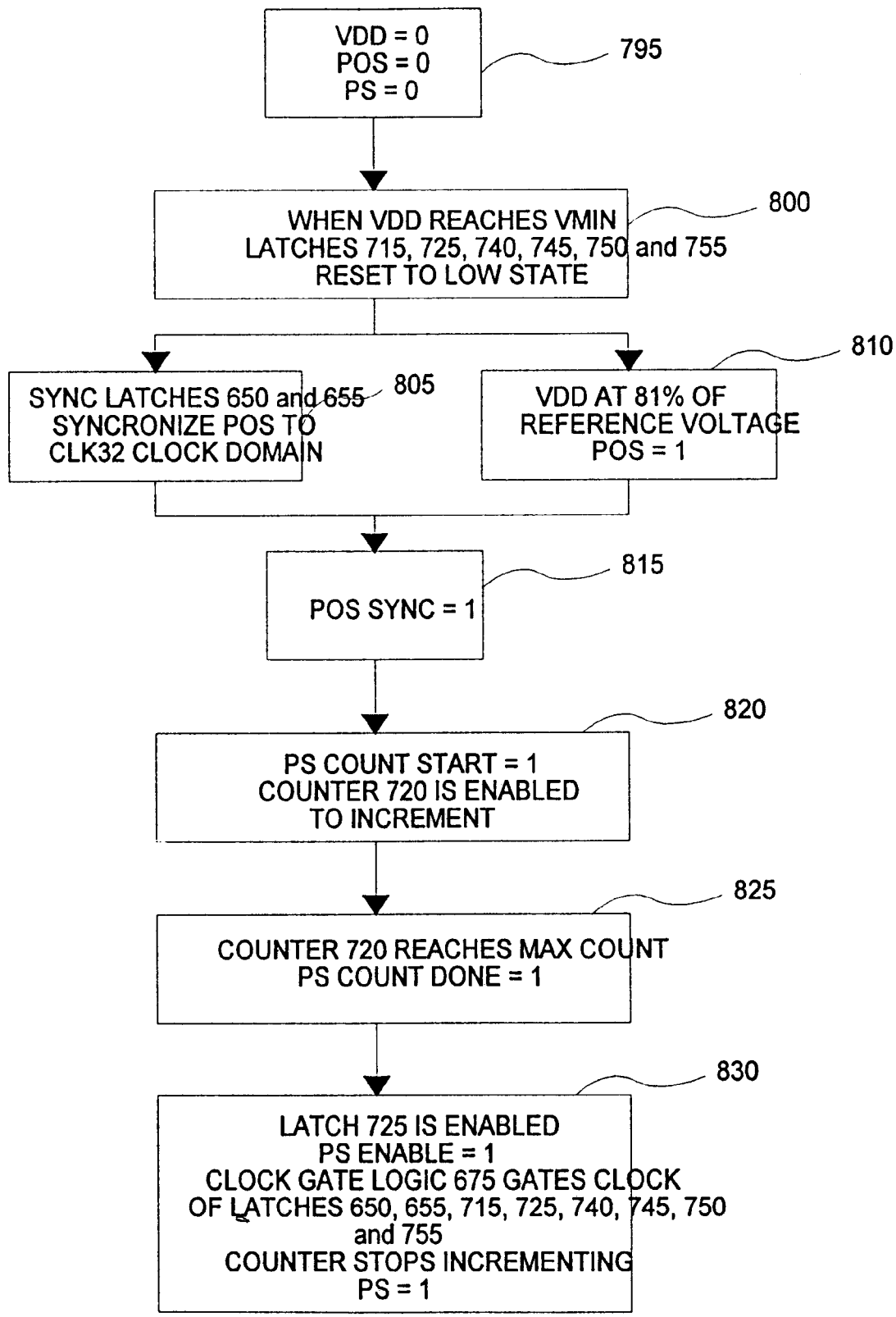
FIG. 18 is a flowchart illustrating the power up of VDD according to the second embodiment of the present invention

FIG. 18 is a flowchart illustrating the power up of VDD according to the second embodiment of the present invention. In step 795, VDD, POS and PS are low. In step 800, when VDD reaches VMIN, latches 715, 725, 740, 745, 750 and 755 are reset to a low state. Steps 805 and 810 occur simultaneously. In step 805, latches 650 and 655 synchronize POS to the CLK32 domain. In step 810 VDD reaches the second predetermined fraction (81%)of reference voltage. In step 815, PS SYNC goes high. In step 820 PS COUNT START goes high and counter 820 is enabled to increment. In step 825, latch 725 is enabled, PS ENABLE goes high, clock logic circuit 675 gates clocking of latches 650, 655, 715, 725, 740, 745, 750 and 755, counter 720 stops incrementing and PS hoes high.

It should be understood that, for the first embodiment of the present invention, voltage detector 205, 32K Clock 210, power supply 247 and 66 MHz synchronizing logic circuit 240 may feed multiple voltage islands 260, each having its own copy of 32 Kz synchronizing logic circuit 240, counter 225, combinational logic 237 and fencing logic circuit 245. Optionally, a single 32 Kz synchronizing logic circuit 240 may feed multiple voltage islands. With the addition of one or more low frequency clocks several voltage islands running at different frequencies are possible. For the second embodiment of the present invention, voltage detector 205, 32K Clock 210, power supply 247, clock logic circuit 675, AND gates 705 and 710, latches 715 and 725 and counter 720 may feed multiple voltage islands 702 each having its own copy of fencing logic circuit 660. Optionally, a single 32 Kz synchronizing logic circuit 645 may feed multiple voltage islands.

The description of the embodiments of the present invention is given above for the understanding of the present invention. It will be understood that the invention is not to the particular embodiments described herein, but is capable of various modifications, rearrangements and substitutions, as for example, different values may be used for any of the clock frequencies, as will now become apparent to those skilled in the art without departing from the scope of the invention. Therefore it is intended that the following claims cover all such modifications and changes as fall within the true spirit and scope of the invention.

What is claimed is:

1. An electronic device comprising:
    a voltage island switchable between a normal power supply and a standby power supply, said voltage island including circuits for receiving input signals;
    a voltage detector outputting a power sense signal in response to a fall to a first voltage value from a reference value or a rise to a second voltage value from said reference value of the voltage of said normal power supply;
    a standby clock generating a standby clock signal;
    a standby clock synchronizing circuit receiving said power sense signal and said standby clock signal, synchronizing said power sense signal to said standby clock domain and outputting a standby clock synchronized power sense signal;
    a counter receiving said standby clock synchronized power sense signal and said power sense signal, adding a delay to said standby clock synchronized power sense signal and outputting a delayed standby clock synchronized power sense signal;
    a normal clock synchronizing circuit receiving said delayed standby clock synchronized power sense signal, synchronizing said delayed standby clock synchronized power sense signal to said normal clock domain and outputting a delayed normal clock synchronized power sense signal; and
    a fencing logic circuit receiving said delayed normal clock synchronized power sense signal and forcing said input signals high or low synchronously with said delayed normal clock synchronized power sense signal.

2. The electronic device of claim 1, wherein the delay of said delayed normal clock synchronized power sense signal is zero for switching said voltage island from normal power to standby power and is at least equal to the time required for normal power to rise from a minimum technology operating voltage to said second voltage value for switching said voltage island from standby to normal power.

3. The electronic device of claim 1, wherein the frequency of said standby clock is lower than the frequency of said normal clock.

4. The electronic device of claim 1, wherein said standby power supply is a battery.

5. The electronic device of claim 1, wherein said first voltage value different than said second voltage value.

6. The electronic device of claim 1, wherein said normal clock synchronizing circuit further synchronizes said delayed normal clock synchronized power sense signal to the low phase of said normal clock domain.

7. The electronic device of claim 1, wherein said counter generates said delayed standby clock synchronized power sense signal by inputting said standby clock synchronized power sense signal to a counting circuit, said counting circuit counting from a set value to a fixed value before outputting said delayed standby clock synchronized power sense signal.

8. The electronic device of claim 7 wherein said counter is reset to said set value after normal power falls below said first voltage value.

9. The electronic device of claim 8, wherein said resetting of said counter is delayed for a first fixed number of standby clock cycles after generation of said standby clock synchronized power sense signal.

10. The electronic device of claim 1, further including a combinational logic circuit;
said combinational logic circuit further delaying said delayed normal clock synchronized power sense signal by a second fixed number of standby clock cycles after generation of said delayed normal clock synchronized power sense signal.

11. The electronic device of claim 1, wherein said standby clock synchronizing circuit, said counter and said fencing logic circuit are located in said voltage island.

12. The electronic device of claim 1, wherein said voltage detector, said standby clock, and said normal clock synchronizing circuit feed multiple voltage islands, each voltage island having a standby clock synchronizing circuit, a counter and a fencing logic circuit.

13. The electronic device of claim 1, further including a combinational logic circuit, said combinational logic circuit including:
circuitry for adding a further delay to said delayed standby clock synchronized power sense signal and logically ANDing the further delayed standby clock synchronized power sense signal with said power sense signal before said delayed standby clock synchronized power sense signal is received by said normal clock synchronizing circuit; and
circuitry for logically ANDing said standby clock synchronized power sense signal, said delayed standby clock synchronized power sense signal and said delayed normal clock synchronized power sense signal before said delayed normal clock synchronized power sense signal is received by said fencing logic circuit.

14. The electronic device of claim 1, wherein said fencing logic circuit provides a fenced clock signal by forcing said normal clock signal on and off synchronously with said delayed normal clock synchronized power sense signal.

15. An electronic device comprising:
a voltage island switchable between a normal power supply and a standby power supply, said voltage island including circuits for receiving input signals;
a voltage detector outputting a power sense signal in response to a fall to a first voltage value from a reference value or a rise to a second voltage value from said reference value of the voltage of said normal power supply;
a standby clock generating a standby clock signal;
a standby clock synchronizing circuit receiving said power sense signal and said standby clock signal, synchronizing said power sense signal to said standby clock domain and outputting a standby clock synchronized power sense signal;
a counter receiving said standby clock synchronized power sense signal and said standby clock signal, adding a delay to said standby clock synchronized power sense signal and outputting a delayed standby clock synchronized power sense signal; and a fencing logic circuit receiving said delayed standby clock synchronized power sense signal and forcing said input signals high or low synchronously with said delayed standby clock synchronized power sense signal.

16. The electronic device of claim 15, wherein:
said delayed standby clock synchronized power sense signal goes low when normal power fall bellow said first voltage value and stays low when normal power is off; and
said delayed standby clock synchronized power sense signal stays low until after said counter outputs said standby clock synchronized power sense signal in response to normal power rising above said second voltage value.

17. The electronic device of claim 15, wherein the delay of said delayed normal clock synchronized power sense signal is zero for switching said voltage island from normal power to standby power and is at least equal to the time required for normal power to rise from a minimum technology operating voltage to said second voltage value for switching said voltage island from standby to normal power.

18. The electronic device of claim 15, wherein the frequency of said standby clock is lower than the frequency of said normal clock.

19. The electronic device of claim 15, wherein said standby power supply is a battery.

20. The electronic device of claim 15, wherein said first voltage value is different than said second voltage value.

21. The electronic device of claim 15, wherein said normal clock synchronizing circuit further synchronizes said delayed normal clock synchronized power sense signal to the low phase of said normal clock domain.

22. The electronic device of claim 15, wherein said counter generates said delayed standby clock synchronized power sense signal by inputting said standby clock synchronized power sense signal to a counting circuit, said counting circuit counting from a set value to a fixed value before outputting said delayed standby clock synchronized power sense signal.

23. The electronic device of claim 21 wherein said counter is reset to said set value after normal power falls below said first voltage value.

24. The electronic device of claim 15, wherein said fencing logic circuit is located in said voltage island.

25. The electronic device of claim 15, wherein said voltage detector, said standby clock and said counter feed multiple voltage islands, each voltage island having a fencing logic circuit.

26. A method for fencing signals in an electronic device, comprising:
providing a voltage island switchable between a normal power supply and a standby power supply, said voltage island including circuits for receiving input signals;
outputting a power sense signal in response to a fall to a first voltage value from a reference value or a rise to a second voltage value from said reference value of the voltage of said normal power supply;
generating a standby clock signal;
synchronizing said power sense signal to said standby clock domain to create a standby clock synchronized power sense signal;
adding a delay to said standby clock synchronized power sense signal to create a delayed standby clock synchronized power sense signal;
synchronizing said delayed standby clock synchronized power sense signal to said normal clock domain to create a delayed normal clock synchronized power sense signal; and forcing said input signals high or low synchronously with said delayed normal clock synchronized power sense signal.

27. The method of claim 26, wherein the delay of said delayed normal clock synchronized power sense signal is zero for switching said voltage island from normal power to standby power and is at least equal to the time required for normal power to rise from a minimum technology operating voltage to said second voltage value for switching said voltage island from standby to normal power.

28. The method of claim 26, wherein the frequency of said standby clock signal is lower than the frequency of said normal clock signal.

29. The method of claim 26, wherein said standby power supply is a battery.

30. The method of claim 26, wherein said first voltage value is different than said second voltage value.

31. The method of claim 26, further including synchronizing said delayed normal clock synchronized power sense signal to the low phase of said normal clock domain.

32. The circuit of claim 26, further including delaying said delayed normal clock synchronized power sense signal by a fixed number of standby clock cycles after generation of said delayed normal clock synchronized power sense signal.

33. The method of claim 26, further including:

adding a further delay to said delayed standby clock synchronized power sense signal and logically ANDing the further delayed standby clock synchronized power sense signal with said power sense signal; and logically ANDing said standby clock synchronized power sense signal, said delayed standby clock synchronized power sense signal and said delayed normal clock synchronized power sense signal.

34. The method of claim 26, wherein said fencing logic circuit provides a fenced clock signal by forcing said normal clock signal on and off synchronously with said delayed normal clock synchronized power sense signal.

35. A method for fencing signals in an electronic device, comprising:

providing a voltage island switchable between a normal power supply and a standby power supply, said voltage island including circuits for receiving input signals;

outputting a power sense signal in response to a fall to a first voltage value from a reference value or a rise to a second voltage value from said reference value of the voltage of said normal power supply;

generating a standby clock signal;

synchronizing said power sense signal to said standby clock domain to create a standby clock synchronized power sense signal;

adding a delay to said standby clock synchronized power sense signal to create a delayed standby clock synchronized power sense signal; and forcing said input signals high or low synchronously with said delayed standby clock synchronized power sense signal.

36. The method of claim 35, wherein:

said delayed standby clock synchronized power sense signal goes low when normal power fall bellow said first voltage value and stays low when normal power is off; and said delayed standby clock synchronized power sense signal stays low until after said counter outputs said standby clock synchronized power sense signal in response to normal power rising above said second voltage value.

37. The method of claim 35, wherein the delay of said delayed normal clock synchronized power sense signal is zero for switching said voltage island from normal power to standby power and is at least equal to the time required for normal power to rise from a minimum technology operating voltage to said second voltage value for switching said voltage island from standby to normal power.

38. The method of claim 35, wherein the frequency of said standby clock signal is lower than the frequency of said normal clock signal.

39. The method of claim 35, wherein said standby power supply is a battery.

40. The method of claim 35, wherein said first voltage value is different than said second voltage value.

41. The method of claim 35, further including synchronizing said delayed normal clock synchronized power sense signal to the low phase of said normal clock domain.

* * * * *